United States Patent
Martinez

[15] 3,687,524
[45] Aug. 29, 1972

[54] GLASSLESS MIRROR
[72] Inventor: Eugene Martinez, Irvington-on-Hudson, N.Y.
[73] Assignee: Kamor Products, Inc., Irvington-on-Hudson, N.Y.
[22] Filed: Jan. 6, 1971
[21] Appl. No.: 104,241

[52] U.S. Cl..................................350/288, 350/310
[51] Int. Cl............................G02b 7/18, G02b 5/08
[58] Field of Search......350/288, 299, 310, 318, 320, 350/179, 180; 220/46, 55; 181/32, 24; 92/98; 277/151, 168, 214

[56] References Cited
UNITED STATES PATENTS 3,552,835   1/1971   Benzies..................350/310 X
1,434,860   11/1922  Taylor....................350/310 X

*Primary Examiner*—David Schonberg
*Assistant Examiner*—John W. Leonard
*Attorney*—J. B. Felshin

[57] ABSTRACT

This glassless mirror comprises a frame having grooves at its outer sides receiving a reflective sheet held in stretched condition by a flexible strip pressing the sheet into the grooves. The frame may be made of one extrusion having milled out or mitered corner angles to allow bending the extrusion into polygonal shape. A spring clip retains the meeting ends of the frame in alignment.

The flexible strip is so shaped that it can easily be pressed into the groove and allowed to expand to hold the sheet in the groove.

9 Claims, 8 Drawing Figures

PATENTED AUG 29 1972 3,687,524

INVENTOR.
EUGENE MARTINEZ
BY
J.B. Cushing
ATTORNEY

GLASSLESS MIRROR

This invention relates to mirrors with reflective sheets stretched over support frames.

An object of this invention is to provide a mirror of the character described in which the groove in the frame and the flexible strip that holds the sheet in the groove, are of such cross-section that the strip can be easily bent and pressed into the groove and the flexible reflective sheet will be firmly held in stretched condition on the frame.

Another object of this invention is to provide in a mirror of the character described, a frame that can be made from an extrusion of uniform cross-section, mitered at four spaced portions to allow bending of the extrusion into polygonal shape.

Still another object of this invention is to provide in a mirror of the character described, a polygonal frame, one side of which comprises meeting aligned ends, with means to retain said ends in aligned, abutting relation.

A further object of this invention is to provide a mirror of the character described so constructed that the strip which presses the reflective mirroring sheet into the grooves in the frame sides, holds the frame in closed condition, the construction being such furthermore that the sheet can be cut close to the frame to make for a neat or trim appearance.

A still further object of this invention is to provide a mirror of the character described in which the frame has an overhang from which the front mirroring portion of the reflective sheet is stretched, so that said portion is out of contact and spaced from any other portions of the frame, to provide for a smooth mirror surface, and to permit stretching the sheet by application of heat or mechanically or both.

Yet a further object of this invention is to provide a strong and durable mirror of the character described that shall be relatively inexpensive to manufacture, attractive in appearance, which shall comprise few and simple parts and which shall yet be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown various illustrative embodiments of this invention, FIG. 1 is a side view of an extrusion piece cut and mitered to form the frame of a mirror embodying the invention;

Figure 1:
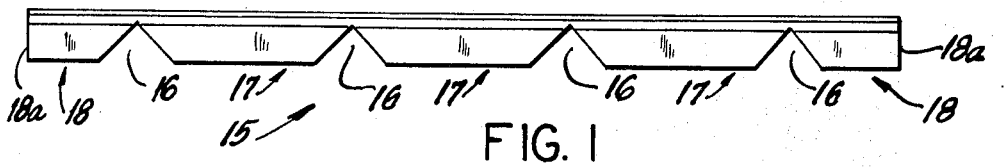
Figure 2:
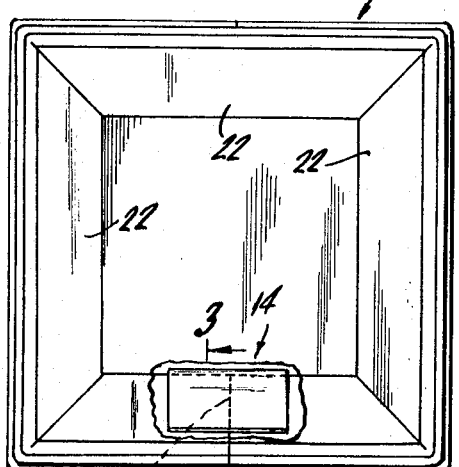
FIG. 2 is a rear elevational view of a mirror embodying the invention.

Referring now in detail to the drawing, 10 designates a mirror embodying the invention. The mirror comprises generally of a polygonal frame 11, a reflective sheet 12 carried by the frame, a flexible strip 13 to attach the sheet to the frame, and a spring clip 14 for holding together abutting ends of the frame.

Said frame 11 may be made from an extrusion of aluminum alloy, or any other suitable material. In FIG. 1 there is shown a piece 15 of extrusion cut to proper length and mitered or right-angularly notched or milled at four equally spaced corners 16 thereby forming three full sides 17 of the frame, and two half sides 18 which together make the fourth side of the frame. This piece 15 is for making a rectangular frame which is shown, it being understood that the frame can be of any polygonal shape, regular or irregular.

Figure 3:
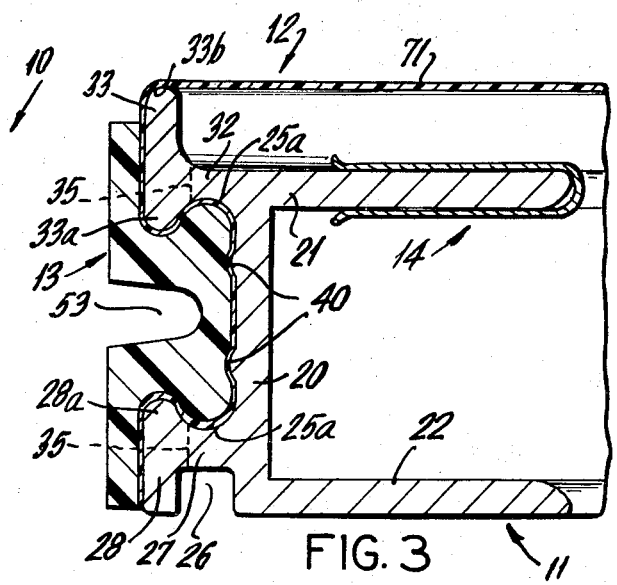
FIG. 3 is an enlarged cross-sectional view taken on line 3—3 of FIG. 2.
Figure 4:
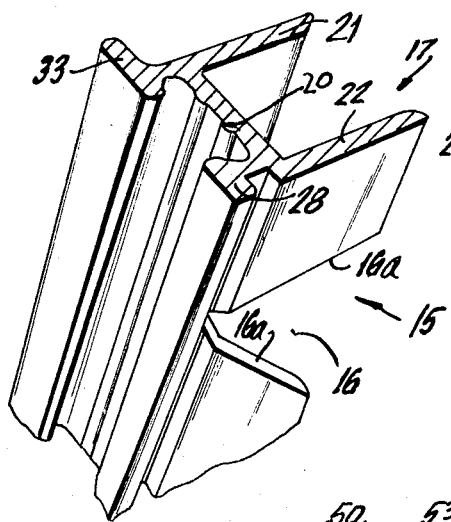
FIG. 4 is a partial perspective view of a piece of the frame.
Figure 5:
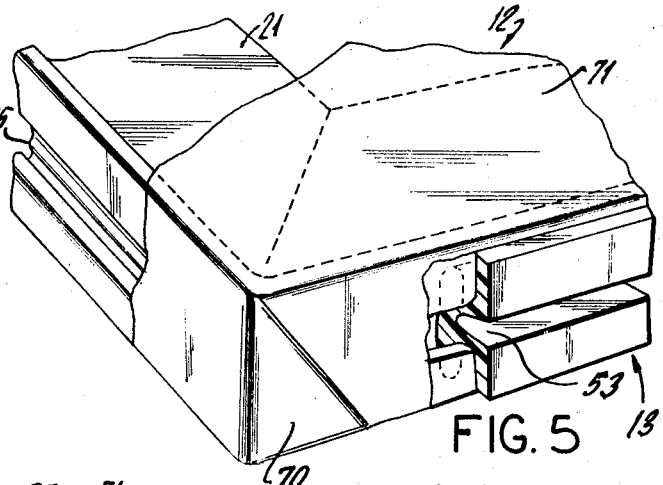
FIG. 5 is a partial top perspective view of one corner of the mirror with parts in cross-section and with part of the strip removed.

In cross-section, the extrusion 15 has an outer web 20 from which a pair of parallel flanges 21, 22, extend inwardly. Flange 21 is at the front and flange 22 is at the rear, and both are at right angles to the web 20. Web 20 has a central groove 25 at its outer side and a rear groove 26. Between grooves 25 and 26 is a web 27, spaced outwardly of flange 22, and forming an outer flange 28 which extends inwardly to overlie an outer part of groove 25, and outwardly to overlie groove 26 (FIG. 3).

At the opposite side of groove 25, web 20 has a web portion 32 which is aligned with flange 21. In the plane of web 28, at said opposite side of groove 25, is formed a flange 33 overlying an opposite side of groove 25 and extending to the front, beyond the plane of flange 21 to form an overhang.

The miters 16 cut away portions of flanges 21, 22 and web 20 and form edges $16^a$ at about 45° to the plane of flanges 28, 33 (which are in alignment). The mitering extends to the dotted lines 35 shown in FIG. 3, so that the sides 17, 18 of the frame, after mitering, are interconnected by portions of webs 27, 32. These portions are thin enough to permit bending the frame sides into a rectangular shape, with the outer ends $18^a$ of piece 15, abutting each other. The frame is held in rectangular shape with ends $18^a$ in abutment, by a spring clip 14 which is of U-shape and thin enough to frictionally and resiliently engage adjacent portions of flanges 21, near the abutment.

The inner ends $28^a$, $33^a$ of flanges 28, 33 are substantially semi-cylindrical. The front ends $33^b$ of flanges 33 are also semi-cylindrical. The outer undercut sides $25^a$ of groove 25 which the inner ends of flanges 28, 33 overhang, are semi-cylindrical but of a diameter somewhat greater than that of the inner ends $28^a$, $33^a$ of flanges 28, 33 and the outer ends $33^b$ of flanges 33. The bottom of the groove 25 may be flat but it is provided with a pair of spaced raised shallow ridges or ribs 40 of curved outer cross-section.

Figures 6, 7:
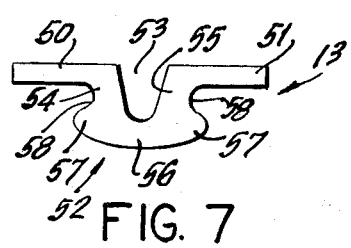
FIG. 6 is a partial perspective view showing the folds in the reflective sheet at one corner.
FIG. 7 is a cross-sectional view of the stripping for use in the mirror embodying the invention.

The strip 13, before assembly with the frame, is shown in cross-section in FIG. 7. Said strip is made of flexible synthetic plastic or rubber-like material. Said strip has aligned flanges or wings 50, 51 extending in opposite directions and are interconnected by a generally U shaped portion 52 forming a deep groove 53 between said flanges. Said portion 52 comprises webs 54, 55 extending from the inner ends of flanges 50, 51 interconnected by a bottom portion 56 which has similar, symmetrical side extensions 57. The bottom surface of portion 56 is part-cylindrical. The extensions 57 are substantially semi-cylindrical on radii somewhat smaller than the radii of ends 25$^a$ of groove 25. Between extensions 57 and flanges 50, 51 are substantially semi-cylindrical grooves 58 of radii similar to the radii of portions 57.

The depth of portion 52 from the undersides of flanges 50, 51 to a plane parallel to said undersides and tangent to the curved undersurface of portion 56, is somewhat greater than the depth from the top surface of flanges 28, 33 to the bottom of groove 25, so that when the strip is applied to the groove, the curved undersurface of portion 56 will be squeezed and flattened. The groove 53 in the strip allows the portions 50, 51 to be bent together, thus narrowing said groove, to allow first one side 57 to be inserted into one undercut side 25$^a$ of the groove 25, and then the other end 57 to then be pressed into the other side undercut groove 25$^a$. The sheet 12 is a glassless mirror. This sheet may comprise a polyester film or vinyl, acrylic or acetate film coated with aluminum, or the like mirroring metal. One side of the film is vacuum plated to coat with the metal or it may be electroplated or coated in any other way.

The coated side of the film is the inside or mirror side. For a rectangular frame, a rectangular sheet 12 is employed. The size of sheet 12 is equal to the size of the frame plus enough border to fit over the flanges 33, 28 and to line the inner surface of the groove 25. The four corners of the film are folded as at 70 after fitting the film over the front of the frame as shown at 71 and over flanges 33 at the four sides. The film is then pushed into the grooves 25 and over the flanges 28 and folded at the four corners. The folds 70 each comprise a triangular portion 70$^a$ under which is folded a similar triangular portion 70$^b$. Folds 70$^a$, 70$^b$ are folded together against portions of the film which overlie flanges 28, 33. The strip, when applied, presses a portion of the film into groove 25 and presses it against the inner surface of the groove and against the ridges 40.

The film portion 71 may be stretched by heating in a heat chamber to shrink the film or by mechanical means or both.

It will be seen that mirror portion 71 is well spaced from flange 21 and presents an unbroken mirror area.

The groove 25 is continuous and the strip 13 is a single piece. It could be made in several pieces.

Figure 8:
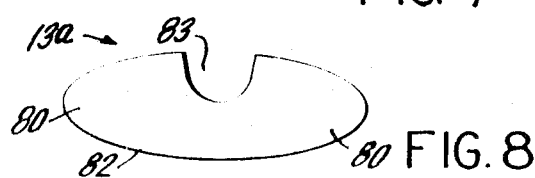
FIG. 8 is a cross-sectional view of a modified form of stripping.

In FIG. 8 there is shown a modified form of strip. The strip 13$^a$ has sides 80 of same radius as portions 57 of strip 13. The bottom surface 82 has radius similar to the radius of bottom surface of portion 56 of said strip 13.

At the top, strip 13$^a$ has a longitudinal groove 83. Thus, to get strip 13$^a$ into groove 25, the strip is folded at the top longitudinally, to constrict or close groove 83, then one side 80 is inserted in one side 25$^a$ of the groove 25, then the strip is allowed to expand and the other side 80 is pressed into the other side of the groove. Of course, this is done with the film in the groove and over the flanges 33, 28. The top of the strip may be shaped similarly to the underside at opposite sides of groove 83.

It will be observed that the top longitudinal grooves 53 of strip 13 and 83 of strip 13$^a$, permit folding or squeezing the strip together to narrow the grooves or bring the bifurcated sides or wings of the strip together, to facilitate first getting one side of the strip into one groove portion 25$^a$, and then releasing the squeeze on the strip to permit pushing the other side of the strip into the other groove 25$^a$.

With such construction, the film may be easily and firmly quickly attached to the frame against being pulled out.

The strip as well as the spring clip keep the frame in rectangular shape with the ends 18$^a$ of the frame in abutment.

The film may be cut at the outer ends of flanges 28, to trim the sheet 12.

The frame can also be of round or any other desired shape and mitered or not mitered. It can be injection molded or fabricated in any other manner.

The frame may be made of one or more extrusions or pieces connected together by clips or in any other suitable manner. The frame may be made of any suitable material and in any suitable manner.

When the strip is in the groove it can be loose or have a sloppy fit or it can fill the groove. When the film is stretched it pulls at points 33$^b$ and pulls against the strip, and tends to rock or rotate it, to bind the film on the frame, by creating a wedging action.

As to strip 13$^a$, it can be bent to open the groove 83, and both sides can then be inserted at one time and the strip then flattened down to form a lock. This lock will not open as it acts as a one way toggle lock, since it cannot easily be pulled out again.

The corners of the sheet may be folded to opposite sides, instead of to one side only as shown in FIG. 6.

A filler of polyurethane or cardboard, composition board or wood, may be inserted into the channels formed between flanges 21, 22.

Flange 22 may be omitted for smaller mirrors if desired.

It will thus be seen that there is provided a device in which the several objects of this invention are achieved and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative.

I claim:

1. In combination, a glass-less mirror comprising a frame formed with a groove around its periphery, a flexible reflective sheet having a portion covering the front of the frame and a portion overlying the portion of the frame formed with said groove and substantially lining the inside surface of said frame groove, said frame groove having undercut side portions, with said frame having means overlying said undercut side portions and a flexible strip in the frame groove, said flexible strip having a longitudinal groove and being longitudinally foldable about a line parallel to and spaced from the side edges of the strip, said flexible strip pressing the sheet into the frame groove and having side portions pushing the sheet into and compressively filling said undercut portions of the frame groove to hold the portion of the sheet at the front of the frame in stretched condition.

2. The combination of claim 1, said frame being split and having meeting ends, and said groove being continuous all around the frame.

3. The combination of claim 1, said frame having a first flange extending inwardly of said outer portion of said frame, and a flange at the front extending forwardly beyond said first flange, whereby the front portion of said first sheet is spaced from said first flange.

4. The combination of claim 1, said frame comprising a single piece of uniform cross-section, mitered at spaced corners, and having abutting frame ends.

5. The combination of claim 4, and a spring clip engaging portions of the frame adjacent said abutting ends, to help keep the frame closed.

6. The combination of claim 1, said frame being of U-shaped transverse cross-section and having an outer portion and a pair of spaced flanges extending inwardly from said outer portion, said outer portion being formed with said groove at the outer side thereof.

7. The combination of claim 1, the bottom of said groove having one or more ridges.

8. The combination of claim 1, said strip having wings overlying the outer side of said frame.

9. The combination of claim 1, said groove being continuous, said strip being a single strip extending all around the frame.

* * * * *

PO-1050
(5/69)

UNITED STATES PATENT OFFICE
CERTIFICATE OF CORRECTION

Patent No. 3,687,524          Dated August 29, 1972

Inventor(s) Eugene Martinez

It is certified that error appears in the above-identified patent and that said Letters Patent are hereby corrected as shown below:

In the title page, the Assignee, "Kamor Products, Inc." should read, --Kamar Products, Inc.--

Signed and sealed this 9th day of January 1973.

(SEAL)
Attest:

EDWARD M. FLETCHER, JR.
Attesting Officer

ROBERT GOTTSCHALK
Commissioner of Patents